Feb. 4, 1936. E. A. GOULD ET AL 2,029,477
TANK FILLING PIPE CLOSURE
Filed April 24, 1935
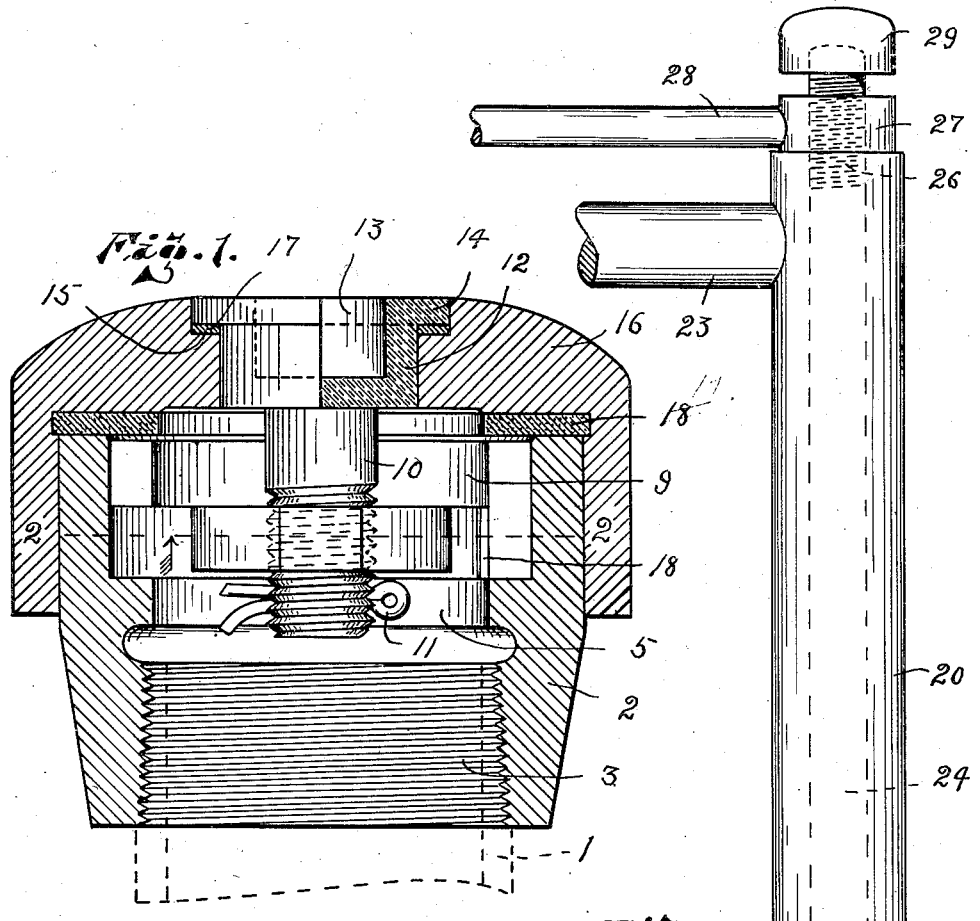
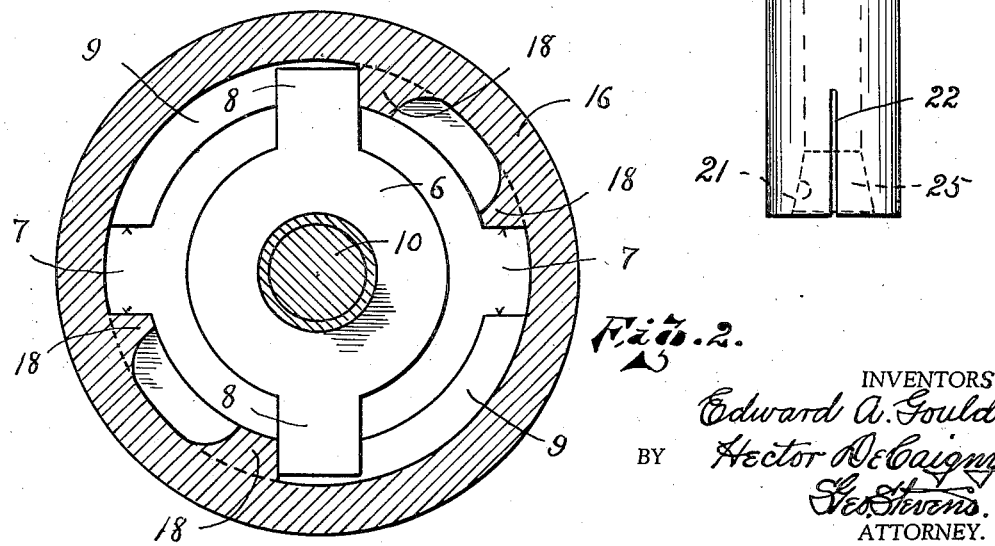
INVENTORS.
Edward A. Gould.
Hector DeCaigny.
BY Geo. Stevens.
ATTORNEY.

Patented Feb. 4, 1936

2,029,477

UNITED STATES PATENT OFFICE 2,029,477

TANK FILLING PIPE CLOSURE

Edward A. Gould and Hector De Caigny, Duluth, Minn.

Application April 24, 1935, Serial No. 18,003

2 Claims. (Cl. 138—89)

This invention relates to pipe closures or caps and has special reference to one adapted for use upon the filling pipe of gas or oil tanks such as employed in connection with filling stations, or the like.

The principal object is to provide a more simple and practical cap of this character, and one operable only by a specific form of key or wrench, thus rendering a pipe thus equipped as free as possible from unauthorized access.

Another object is to provide such a cap free from vapor leakage, or the possibility of moisture leaking into the tank thus equipped about the cap.

Other objects and advantages of the invention will appear in the following description thereof.

Referring now to the accompanying drawing, forming part of this application and wherein like reference characters indicate like parts:

Figure 1 is a central vertical section, partly in elevation, of one of our pipe caps or closures.

Figure 2 is a transverse section on the line 2—2 of Figure 1.

Figure 3 is a side elevation of the wrench or tool especially adapted for manipulation of the cap, the handles of said tool being broken away.

We have illustrated in dotted lines at 1 the terminal of a supply pipe for a gasolene or other tank, upon which our improved map may be used. The cap or closure embodying the invention comprises the male member or sleeve indicated at 2, the lower portion of which is internally screw threaded as at 3 for ordinary application to the filling pipe 1. Above the annular channel 4 about the inner terminal of the screw threaded portion 3, which is commonly formed for convenience in cutting the threaded portion in such devices, the interior of the cap is provided with a bore at least equal to the capacity of the pipe resulting in an annular seat indicated at 5, the upper surface of which is flat and of somewhat greater diameter than the lower surface. Above the upper surface of the seat 5 is provided sufficient space both vertically and horizontally for the locking wing-nut or spider 6, and above which space for the wing nut the bore of the sleeve 2 is of the same diameter as the bore of the seat 5 except at two diametrically opposite sides where squared openings 7 are formed for reception of the opposed lugs 8 on the spider 6, thus providing an annular seat 9 about the upper inner terminal of the sleeve 2 with the exception of the two opposed squared channels through which the spider may be raised and lowered when desired.

The spider 6 is internally screw threaded and carried upon the locking bolt 10, it being held normally in its lowermost position on the bolt after being applied thereto by a suitable cotter pin indicated at 11, the object of which will be described later. The upper end of the head of the bolt 10 is enlarged as at 12 and provided with a central circular chamber or socket 13 therein, and the extreme upper portion of the head of the bolt is flanged outwardly as at 14 for engagement upon the annular seat 15 about the bolt hole through the cap proper 16 or female member of the closure. Beneath this flanged portion and the seat 15 is installed the brass washer or gasket 17 to insure a tight connection between the head of the bolt and the cap 16; and between the upper flat annular surface of the sleeve 2 and the inner face of the head of the cap 16 is installed preferably a leather washer 19 to insure against leakage of vapor from the tank to which the closure is applied, though, of course, it is obvious that other forms of washers and gaskets may be used if preferred.

It is to be understood that the head 12 of the bolt 10 is of chilled steel, case hardened, or otherwise rendered resistant to the convenience of applying a cold chisel or the like in an unauthorized attempt to open same.

It will be noted that two diametrically opposed pairs of stops 18 are formed intermediate of the annular seats 5 and 9, they being for the purpose of preventing the spider 6 being turned to the left after entering the space intermediate of said seats; as it can only be turned to the right or clockwise until it engages the opposed stops 18, when further turning of the bolt tends to throw the spider upwardly and clamp the cap 16 downwardly into its position; the opposite action obviously resulting in only anti-clockwise turning of the spider 6 after the bolt has been turned backwardly sufficiently to loosen same, when the lugs 8 of the spider will engage the other two opposite stops 18 and the spider will then be in line for proper vertical removal from the cap.

The special wrench for the manipulation of this closure is illustrated in Figure 3 as before stated and comprises the hollow tubular member 20, having a tapered bore 21 at its lowermost end, and split preferably upon diametrically opposite sides as at 22 for a short distance above the tapered portion 21; and the upper end of the tube is provided with any form of suitable laterally projecting handle 23.

Within this tube is loosely fitted the bolt or rod 24, having a tapered head 25 which normally snugly fits within the tapered portion 21 of the bore of the tube, and when drawn upwardly within said tapered portion will tend to expand the split end of the tube. For this manipulation of the bolt 24 the upper end thereof is screw threaded as at 26 and provided with the handled nut 27, the handle being shown at 28, and above which attachment the bolt is provided with a suitable cap 29, the object of which is to provide a convenient terminal for the bolt which may be struck with another instrument to loosen the wedge like action of the tapered head of the bolt in the tapered terminal of the tube.

Now the lower end of the tube 20 is of a size to readily fit within the socket 13 of the bolt 10, and when expanded by a stress upwardly on the bolt 24 will become tightly engaged therein, permitting of convenient turning of the bolt 10 in either direction by the turning of the wrench; it being understood that when the bolt 10 is first applied to the assembled cap, the spider is in its ultimate unscrewed position until resting on the cotter pin 11 so that when the bolt thus assembled with the spider is inserted into the closure the spider will readily turn with the bolt in its clockwise motion until engaging the stops 18, previously described, when further rotation of the bolt tends to draw the assembled parts snugly and firmly together, resulting in the desired assembly.

It will be noted that by this assembly of cap or closure the member 16 may be rotated without in any way affecting the efficiency of the cap, such turning, however, only taking place in the event of someone attempting to open same without the proper tools.

Having thus described our invention, what we claim and desire to secure by Letters Patent, is:

1. A pipe closure of the type described comprising a male portion for attachment to the pipe, a female portion slidably mountable externally upon said male portion, a holding bolt axially mounted within said female portion and having a circular chilled socket in its head for engagement with a suitable wrench, the upper portion of said head being flush with the upper surface of said female portion, and means screw-threadedly carried by said bolt for selective engagement or disengagement with the interior of said male member by rotation of said bolt.

2. A pipe closure of the type described comprising a male portion for attachment to the pipe, a female portion slidably mountable externally upon said male portion, a holding bolt axially mounted within said female portion and having a circular chilled socket in its head for engagement with a suitable wrench, the upper portion of said head being flush with the upper surface of said female portion, and means screw-threadedly carried by said bolt for selective engagement or disengagement with the interior of said male member by rotation of said bolt, said female portion and bolt head further characterized by having opposed annular shoulders for reception of suitable packing therebetween to insure a gas and watertight union and yet permit of rotation of said bolt.

EDWARD A. GOULD.
HECTOR DE CAIGNY.